(12) United States Patent
Li et al.

(10) Patent No.: US 9,729,037 B2
(45) Date of Patent: Aug. 8, 2017

(54) BRUSHLESS MOTOR

(75) Inventors: Yue Li, Hong Kong (CN); Jin Yun Gan, Hong Kong (CN); Chui You Zhou, Hong Kong (CN); Cheng Xue, Shenzhen (CN); Ya Ming Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 473 days.

(21) Appl. No.: 13/594,512

(22) Filed: Aug. 24, 2012

(65) Prior Publication Data
US 2013/0052061 A1    Feb. 28, 2013

(30) Foreign Application Priority Data

Aug. 26, 2011    (CN) .......................... 2011 1 0270919

(51) Int. Cl.
| | | |
|---|---|---|
| H02K 21/22 | (2006.01) | |
| H02K 1/27 | (2006.01) | |
| F04D 25/06 | (2006.01) | |

(52) U.S. Cl.
CPC ......... H02K 21/222 (2013.01); F04D 25/064 (2013.01); F04D 25/0646 (2013.01); H02K 1/2786 (2013.01); H02K 2213/03 (2013.01)

(58) Field of Classification Search
CPC ............... H02K 21/222; H02K 1/2786; H02K 2213/03; H02K 1/27; H02K 2201/03; F04D 25/064; F04D 25/0646
USPC ...... 417/423.1, 354, 423.12, 423.14, 423.15, 417/423.6; 310/156.38, 156.46
See application file for complete search history.

(56) References Cited

U.S. PATENT DOCUMENTS

| | | | | |
|---|---|---|---|---|
| 2,427,947 | A * | 9/1947 | Koch ..................... | F16C 17/04 310/67 R |
| 3,644,066 | A * | 2/1972 | Heob .................... | F04D 29/547 29/889 |
| 4,025,810 | A * | 5/1977 | Field ........................... | 310/162 |
| 4,774,428 | A | 9/1988 | Konecny | |
| 5,164,622 | A | 11/1992 | Kordik | |
| 5,233,253 | A * | 8/1993 | Nishio et al. ............ | 310/184 |
| 5,650,678 | A * | 7/1997 | Yokozawa et al. ......... | 310/90 |
| 6,830,440 | B1 * | 12/2004 | Riddoch ............... | H02K 5/225 417/353 |
| 6,946,760 | B2 * | 9/2005 | Crapo et al. .................. | 310/51 |
| 6,949,864 | B2 * | 9/2005 | Maslov ................... | B62M 6/40 310/254.1 |
| 7,042,121 | B2 * | 5/2006 | De Filippis et al. .......... | 310/63 |
| 7,839,043 | B2 * | 11/2010 | Huang et al. ........... | 310/156.38 |
| 2007/0205676 | A1 * | 9/2007 | Lan et al. ..................... | 310/58 |
| 2008/0157619 | A1 * | 7/2008 | Wu ....................... | H02K 29/03 310/156.48 |
| 2009/0196744 | A1 * | 8/2009 | Yu ....................... | F04D 25/0613 415/177 |

* cited by examiner

*Primary Examiner* — Devon Kramer
*Assistant Examiner* — Lilya Pekarskaya
(74) *Attorney, Agent, or Firm* — Muncy, Geissler, Olds & Lowe, P.C.

(57) ABSTRACT

A brushless motor has a stator and an outer rotor. The stator includes a stator core having 6N teeth and 6N coils wound respectively around the teeth where N is an integer equal to or greater than 1. The rotor includes 6N±2 permanent magnets. The permanent magnets are arranged circumferentially around the stator core and face the teeth across an air gap. The radial thickness of the air gap is uneven along the circumferential direction of the motor.

9 Claims, 4 Drawing Sheets

BRUSHLESS MOTOR

CROSS REFERENCE TO RELATED APPLICATIONS

This non-provisional patent application claims priority under 35 U.S.C. §119(a) from Patent Application No. 201110270919.9 filed in The People's Republic of China on Aug. 26, 2011.

FIELD OF THE INVENTION

The present invention relates to electric motors and in particular, to a brushless direct current motor.

BACKGROUND OF THE INVENTION

With the wide acceptance of brushless direct current (BLDC) motors, the demand for BLDC motors of greater quality has increased. Improvements relating to the number of permanent magnet poles and electromagnetic poles of BLDC motors have been made to increase the quality and efficiency. For example, U.S. Pat. No. 4,774,428, issued to Konecny, teaches a motor having $3(2n+1)\pm1$ permanent magnet poles and $3(2n+1)$ electromagnetic poles. The solution to the quality and efficiency problems provided by the Konecny patent results in a motor with an asymmetrical coil winding pattern and, therefore, significant asymmetrical radial forces. These asymmetrical radial forces are particularly offensive in applications where the motor operates under heavy loads. Also, the even air gap between the permanent magnet poles and the electromagnetic poles results in significant torque ripple or cogging torque.

SUMMARY OF THE INVENTION

Thus there is a desire for a brushless motor having symmetrical radial forces and low cogging torque.

Accordingly, in one aspect thereof, the present invention provides a brushless motor, comprising: a stator comprising a stator core having 6N teeth and a stator winding having 6N coils wound respectively around the teeth, where N is an integer equal to or greater than 1; and a rotor comprising a shaft, a rotor core fixed to the shaft and 6N±2 permanent magnets fixed to the rotor core; wherein the permanent magnets are arranged circumferentially around the stator core and face the teeth across an air gap, the radial thickness of the air gap is uneven along the circumferential direction of the motor.

Preferably, each permanent magnet has a circumferential center and two circumferential ends and the radial thickness of each permanent magnet at the center is greater than the radial thickness at the circumferential ends; and the radial thickness the air gap is less at the center of the magnets than at the circumferential ends of the magnets.

Preferably, the radially inner surface of each permanent magnet is a planar surface.

Preferably, the radially inner surface of each permanent magnet is an arcuate surface with the circumferential center of the magnet being closer to an aligned tooth than the circumferential ends thereof.

Preferably, each tooth of the stator core has at least one slot extending in the axial direction of the motor on the radially outer surface thereof.

Preferably, adjacent permanent magnets are circumferentially spaced from each other.

Preferably, the rotor core comprises a cup-like shell; the shell having a shell end and a substantially tubular wall projecting from the shell end, the permanent magnets being secured to an inner surface of the wall.

Preferably, the shell end comprises a number of assembling holes for mounting a fan.

Preferably, the shell end has a number of openings for air to flow through the interior of the motor.

Preferably, the stator has a mounting plate that has a hollow supporting part fixed to and passing through the center of the stator core, and the shaft is secured to the supporting part by at least two axially spaced bearings fixed to an inner surface of the supporting part.

Preferably, the mounting plate has a recess in a surface facing away from the rotor for receiving a control circuit board.

Preferably, the mounting plate has a through hole communicating with the hollow supporting part.

According to a second aspect thereof, the present invention provides a cooling fan assembly, comprising: a fan; and a brushless motor having a rotor connected to the fan and a stator received in the rotor; wherein the stator comprises: a stator core having 6N teeth and a stator winding having 6N coils wound respectively around the teeth, where N is an integer equal to or greater than 1; and the rotor comprises a shaft, a rotor core fixed to the shaft and 6N±2 permanent magnets fixed to the rotor core; wherein the permanent magnets are arranged circumferentially around the stator core and face the teeth across an air gap, the radial thickness of the air gap is uneven along the circumferential direction of the motor.

Preferably, the fan has a central tubular hub having a compartment and a number of vanes extending radially from the tubular hub, the rotor being disposed in the compartment.

Preferably, the rotor core has the cup-like shell and the fan is connected directly to the shell.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
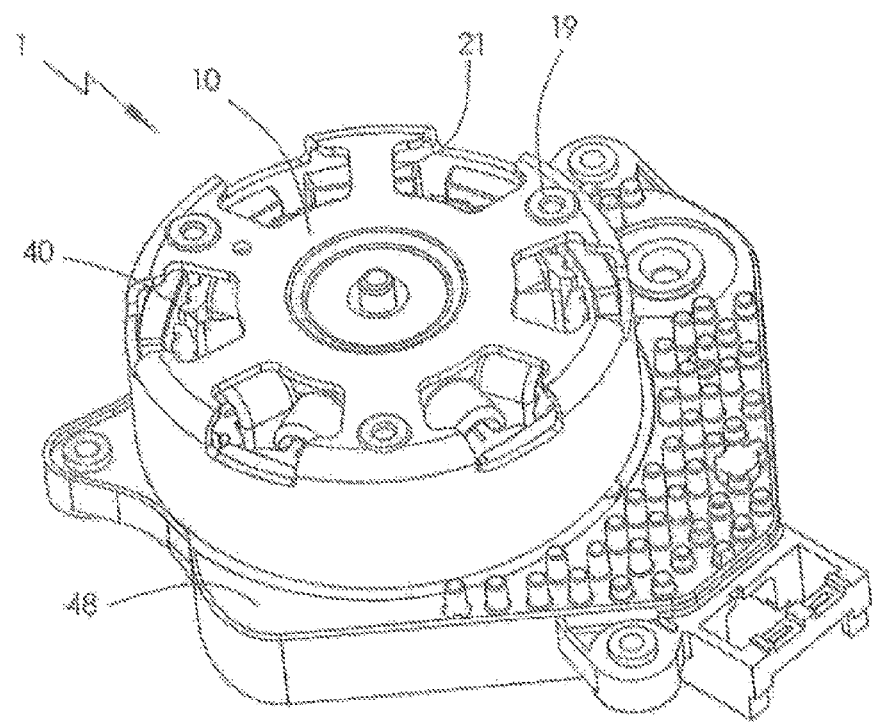
FIG. 1 shows a BLDC motor in accordance with the preferred embodiment of the present invention.
Figure 2:
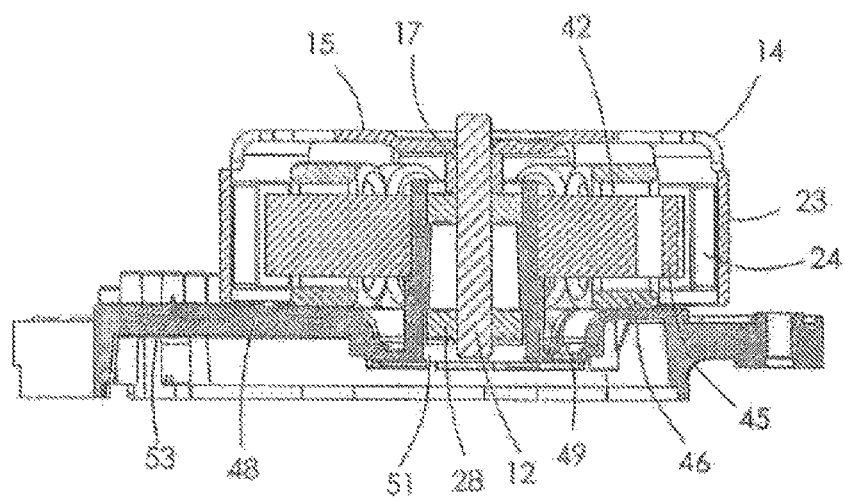
FIG. 2 is a sectional view of the motor of FIG. 1.
Figure 3:
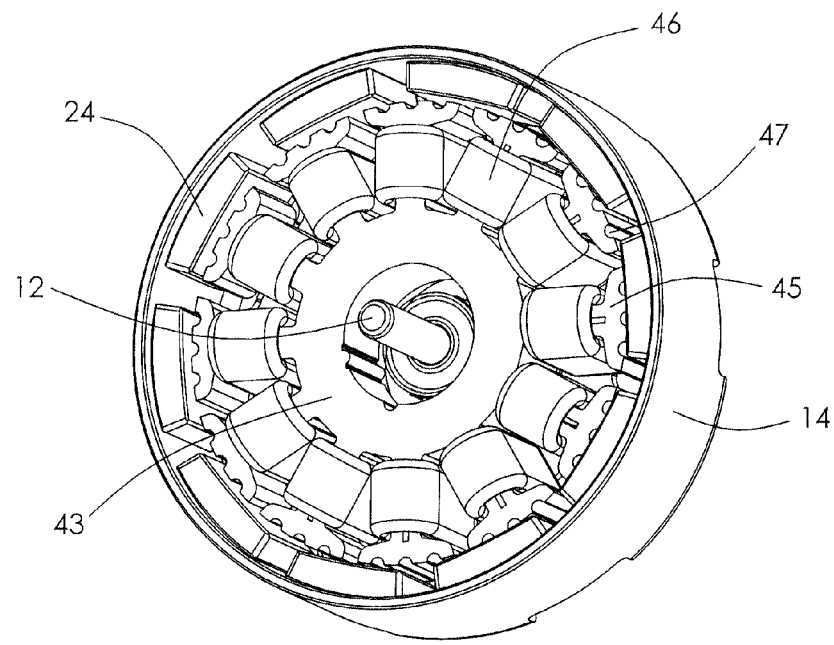
FIG. 3 illustrates a stator and rotor of the motor of FIG. 1.

Referring to FIGS. 1 to 5, a brushless motor 1, according to the preferred embodiment of the present invention, includes a rotor 10 and a stator 40.

The rotor 10 includes a shaft 12, a rotor core fixed to the shaft, and 6N±2 permanent magnets 24 fixed to the rotor core, where N is an integer equal to or greater than 1. In the preferred embodiment, the rotor 10 has ten permanent magnets. The rotor core is in the form of a cup-like shell 14. The shell 14 has a disc-like shell end 15 and a substantially tubular wall 23 extending from the circumferential edge of the shell end 15. The shell end 15 defines a fixing hole 17 at the center thereof. Ideally, the fixing hole is in the form of a tubular boss. The permanent magnets 24 are secured to an inner surface of the wall 23, for example by an adhesive. As such, each permanent magnet 24 constitutes a permanent magnet pole. One end of the shaft 12 is fixed to the shell by being pressed into fixing hole 17.

Figure 4:
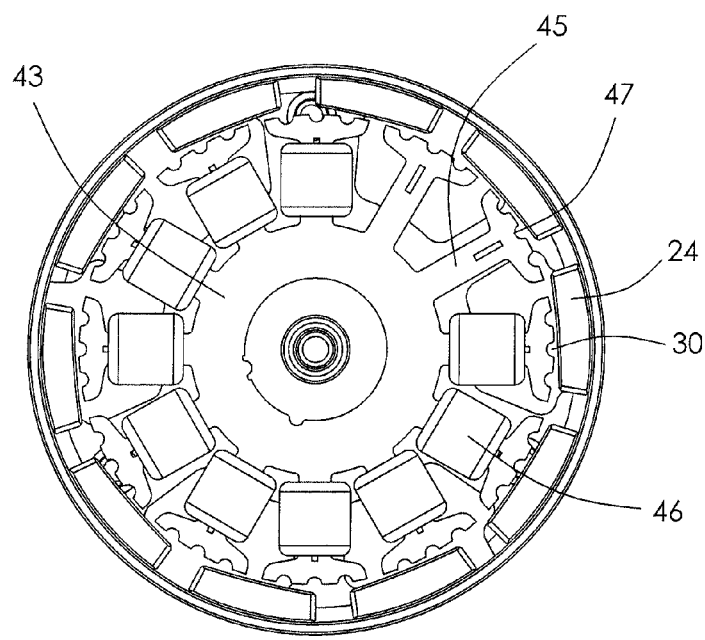
FIG. 4 is a plan view of the stator and rotor of FIG. 3.

The stator 40 includes a stator core 42, a number of coils 46, and a mounting plate 48. The stator core 42 has a substantially tubular yoke 43 and 6N teeth 45 protruding outwards from the outer surface of the yoke 43, where N is an integer equal to or greater than 1. In the preferred embodiment, the stator core 42 has twelve teeth. There are twelve coils 46, each wound about a single respective tooth. The coils 46 can be connected in a "Y" type connection pattern or a "Delta" connection pattern, which is well known and will not be described in detail here. Each tooth 45 and the coil 46 wound there around form an electromagnetic pole. The mounting plate 48 has a hollow, preferably tubular, supporting part 49. The tubular supporting part 49 is inserted into the yoke 43 so that the stator core 42 is fixed to the mounting plate 48. In FIG. 4, which illustrates the rotor 10 and the stator 40 in a plan view of the motor 1 with the mounting plate omitted, two coils also have been omitted to show the structure of the teeth 45 of the stator core.

The shaft 12 is secured in the tubular supporting part 49 by two axially spaced bearings 28 that are fixed in the central through hole of supporting part 49, so that the shell 14 is rotatably fixed to the stator assembly 40. As such, the permanent magnets 24 are arranged around the stator core 42, facing the teeth 45 across air gaps 30. Meanwhile, the free end of the wall 23 is spaced from the mounting plate 48.

The radial thickness of the air gap 30, which means the radial distance between the outer end surface of the tooth 45 and the inner surface of the aligned permanent magnet 24 that faces the tooth 45, is not constant or even in the circumferential direction of the motor 1. Compared to traditional motors with an even air gap, the present motor with uneven air gaps 30 has less iron loss and less cogging torque. Compared to even air gaps, the uneven air gaps 30 also make the back electromotive force (EMF) closer to a Sine wave, so that when currents, especially quasi-sinusoidal currents or sinusoidal currents flow through the coils 46, the torque ripple will become much smaller. Also, as the motor has 6N electromagnetic poles and 6N±2 permanent magnet poles, only two diametrically opposite electromagnetic poles can be simultaneously aligned with the permanent magnet poles. Thus, radial forces are symmetrical and therefore rotation of the motor is smooth.

Preferably, the thickness in the radial direction of the motor at the center of each permanent magnet 24 is greater than the radial thickness at the circumferential ends of the permanent magnet 24. Therefore, the radial thickness of the air gap 30 at the center of each magnet is less than that at the ends of each magnet, thus forming an uneven air gap. However, it should be understood that the curvature of the radially outer surface of the teeth being greater than that of the magnets is another way of forming an uneven air gap.

Figure 5:
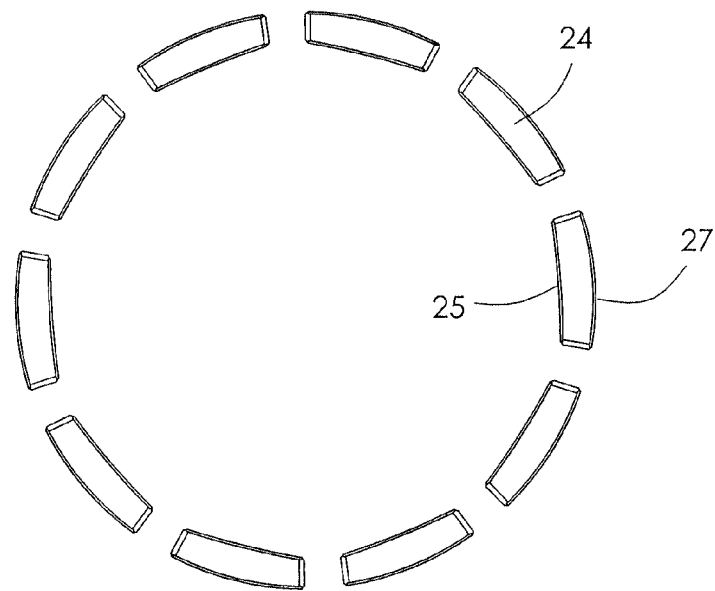
FIG. 5 illustrates the magnets of the rotor of FIG. 4.

Preferably, as shown in FIG. 5, the inner surfaces 25 of the permanent magnets 24 are planar while the outer surfaces 27 thereof are arcuate, conforming to the inner surface of the wall 23. In another embodiment, the inner surfaces 25 of the permanent magnets 24 can also be arcuate surfaces, with the center of the inner surface 25 being closer to an aligned tooth than the circumferential ends thereof.

Preferably, the mounting plate 48 may define a through hole 51 that is in communication with supporting part 49. As such, one of the two bearings 28 can be easily inserted into the supporting part 49 via the through hole 51.

Preferably, adjacent permanent magnets 24 are spaced from each other, which reduces the magnetic flux leakage across the faces of the magnets.

Preferably, each tooth 45 defines at least one slot 47, preferably three slots, extending in the axial direction of the motor on the radially outer surface thereof for decreasing the cogging torque.

Figure 7:
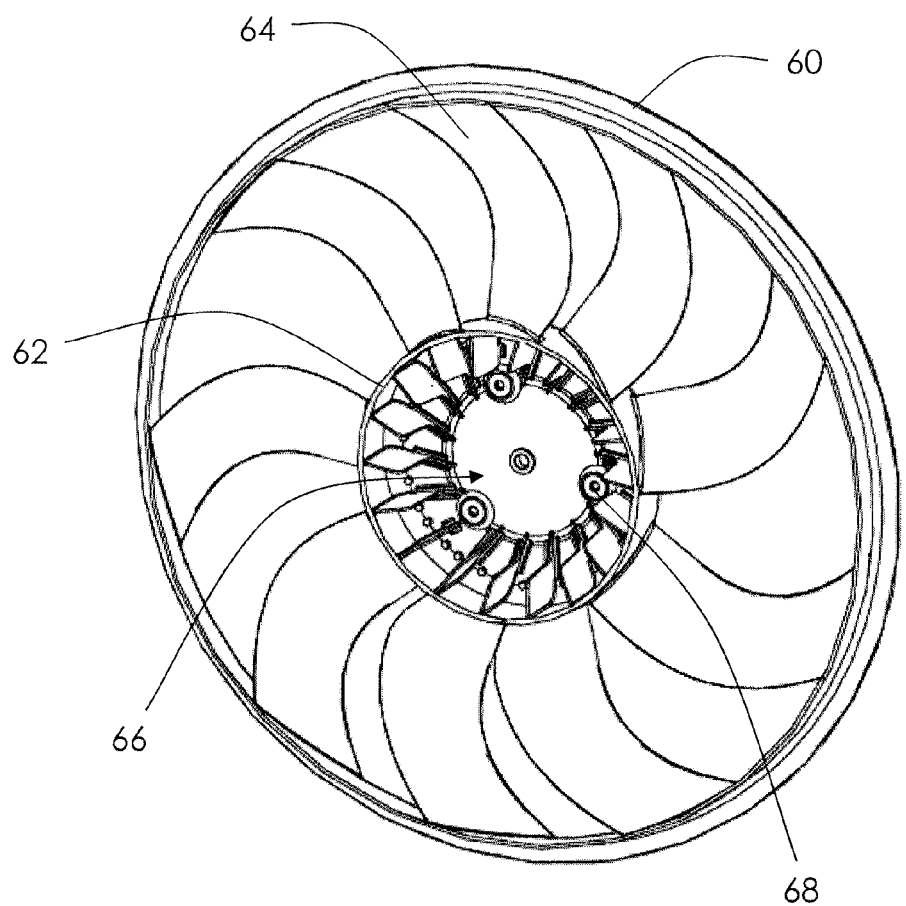
FIG. 7 illustrates a fan for use with the motor of FIG. 1 to form a cooling fan assembly.

Preferably, the shell end 15 defines a number of first assembling holes 19 for mounting a fan 60 such as the fan shown in FIG. 7. The fan 60 includes a central tubular hub 62 and a number of vanes 64 extending radially from the hub 62. The hub 62 defines a number of second assembling holes 68 corresponding to the first assembling holes 19 and a compartment 66 that accommodates the rotor 10 of the motor 1. Screws (not shown) connect the fan 60 to the rotor via the first and second assembling holes 19, 68, so that the rotor 10 is received in the compartment 66. As such, the fan 60 is fixed to the motor to make a cooling fan assembly.

The shell end 15 may further define a number of openings 21 for air to flow through the interior of the motor, that is from the space between the wall 23 and the mounting plate 48 through the air gaps 30 and slots between adjacent teeth 45, and eventually out the openings 21, or vice versa.

Preferably, the mounting plate 48 defines a chamber/recess 53 on the surface facing away from the rotor 10 for receiving a control circuit board (not shown) of the motor.

Figure 6:
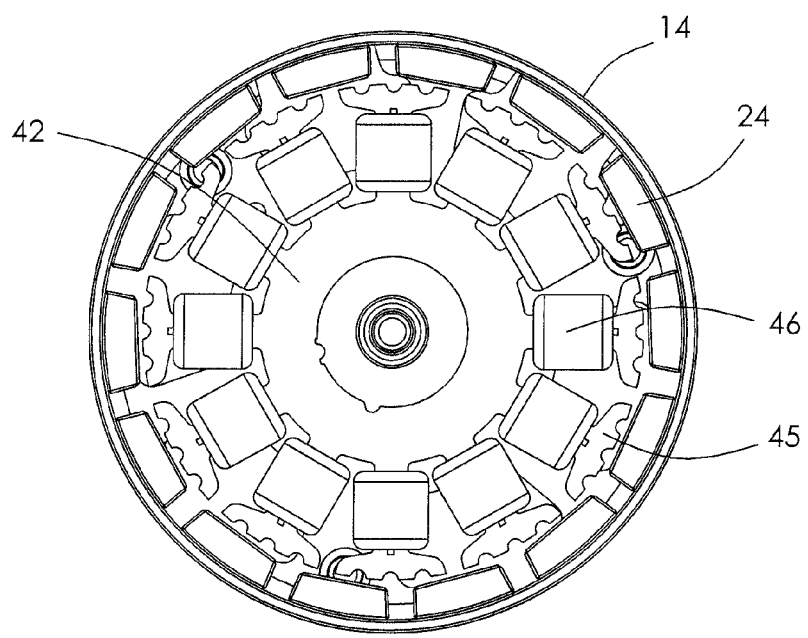
FIG. 6 is a plan view, similar to FIG. 4, of a rotor and stator of a BLDC motor, according to another embodiment of the present invention.

It should be understood that the BLDC motor is not limited to twelve electromagnetic poles and ten permanent magnet poles. For example, a motor having 12 electromagnetic poles and 14 permanent magnet poles is shown in FIG. 6. FIG. 6 illustrates the rotor and stator of a BLDC motor according to a further embodiment of the present invention. Otherwise the construction of this motor is similar to the motor of the first embodiment.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A brushless motor, comprising:
   a stator comprising a stator core having 6N teeth and a stator winding having 6N coils wound respectively around the teeth, where N is an integer equal to or greater than 1; and a rotor comprising a shaft, a rotor core fixed to the shaft and 6N±2 permanent magnets fixed to the rotor core, the rotor core comprising a cup-like shell comprising a shell end, the shell end defining a tubular boss at the center thereof, one end of the shaft being fixed to the shell by a press fit connection with the tubular boss; wherein the permanent magnets are arranged circumferentially around the stator core and face the teeth across an air gap, the radial thickness of the air gap is uneven along the circumferential direction of the motor, each permanent magnet has a circumferential center and two circumferential ends and the radial thickness of each permanent magnet at the center is greater than the radial thickness at the circumferential ends; and the radial thickness of the air gap is less at the center of the magnets than at the circumferential ends of the magnets; wherein the entire radially inner surface of each permanent magnet is an arcuate surface with the circumferential center of the magnet being closer to an aligned tooth than the circumferential ends thereof;

wherein the shell end comprises a number of assembling holes for mounting a fan and a number of openings for air to flow through the interior of the motor;

wherein each tooth of the stator core has at least one slot extending in the axial direction of the motor on the radially outer surface thereof.

2. The motor of claim 1, wherein adjacent permanent magnets are circumferentially spaced from each other.

3. The motor of claim 1, wherein the shell comprises a tubular wall projecting from the shell end, the permanent magnets being secured to an inner surface of the wall.

4. The motor of claim 1, wherein the stator comprises a mounting plate that has a hollow supporting part fixed to and passing through the center of the stator core, and the shaft is secured to the supporting part by at least two axially spaced bearings fixed to an inner surface of the supporting part.

5. The motor of claim 4, wherein the mounting plate further comprises a recess in a surface facing away from the rotor for receiving a control circuit board.

6. The motor of claim 4, wherein the mounting plate further comprises a through hole communicating with the hollow supporting part.

7. A cooling fan assembly, comprising:
a fan; and a brushless motor having a rotor connected to the fan and a stator received in the rotor; wherein the stator comprises: a stator core having 6N teeth and a stator winding having 6N coils wound respectively around the teeth, where N is an integer equal to or greater than 1; and the rotor comprises a shaft, a rotor core fixed to the shaft and 6N±2 permanent magnets fixed to the rotor core, the rotor core comprising a cup-like shell comprising a shell end, the shell end defining a tubular boss at the center thereof, one end of the shaft being fixed to the shell by a press fit connection with the tubular boss; wherein the permanent magnets are arranged circumferentially around the stator core and face the teeth across an air gap, the radial thickness of the air gap is uneven along the circumferential direction of the motor, each permanent magnet has a circumferential center and two circumferential ends and the radial thickness of each permanent magnet at the center is greater than the radial thickness at the circumferential ends; and the radial thickness of the air gap is less at the center of the magnets than at the circumferential ends of the magnets; wherein the entire radially inner surface of each permanent magnet is an arcuate surface with the circumferential center of the magnet being closer to an aligned tooth than the circumferential ends thereof;

wherein the shell end comprises a number of assembling holes for mounting a fan and a number of openings for air to flow through the interior of the motor;

wherein each tooth of the stator core has at least one slot extending in the axial direction of the motor on the radially outer surface thereof.

8. The assembly of claim 7, wherein the fan comprises a central tubular hub having a compartment and a number of vanes extending radially from the tubular hub, the rotor being disposed in the compartment.

9. The assembly of claim 8, wherein the fan is connected directly to the shell end.

* * * * *